J. A. WISE.
POTATO CUTTER.
APPLICATION FILED MAY 19, 1909.
941,001.
Patented Nov. 23, 1909.
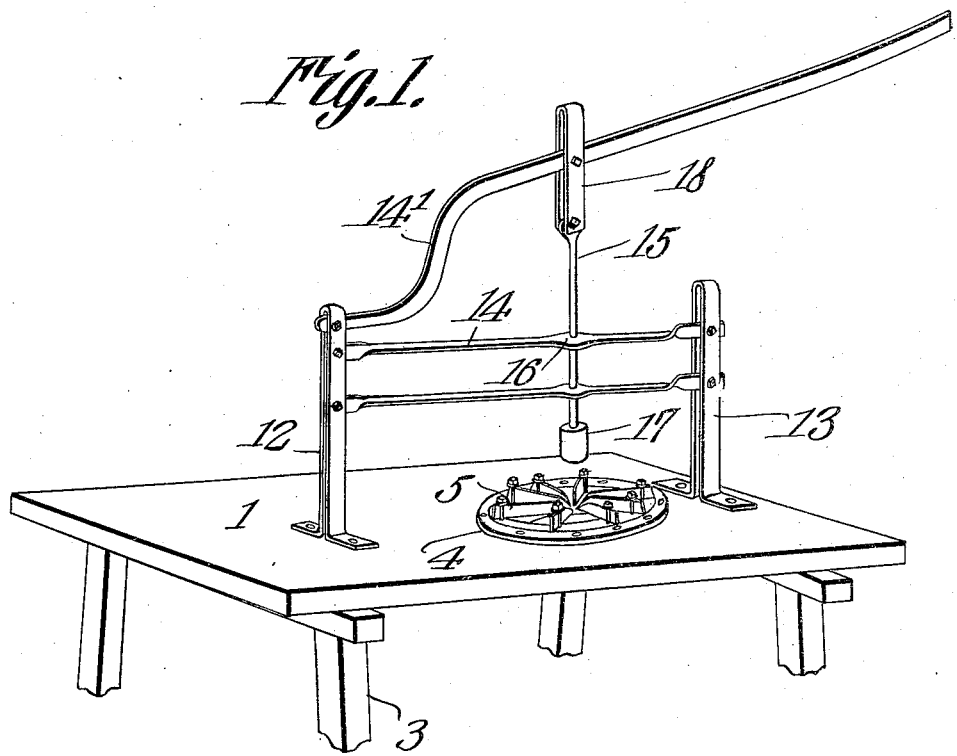
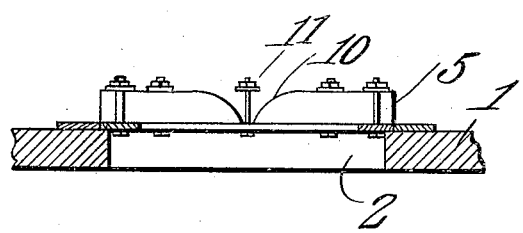
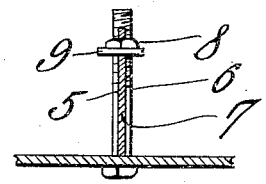
Witnesses
Inventor
James A. Wise.
By C. A. Snow & Co.
Attorneys

UNITED STATES PATENT OFFICE.

JAMES A. WISE, OF DAINGERFIELD, TEXAS, ASSIGNOR OF ONE-HALF TO R. N. TRAYLOR, OF DAINGERFIELD, TEXAS.

POTATO-CUTTER.

941,001. Specification of Letters Patent. Patented Nov. 23, 1909.

Application filed May 19, 1909. Serial No. 497,011.

*To all whom it may concern:*

Be it known that I, JAMES A. WISE, a citizen of the United States, residing at Daingerfield, in the county of Morris and State of Texas, have invented a new and useful Potato-Cutter, of which the following is a specification.

This invention has relation to potato cutters and it consists in the novel construction and arrangement of its parts as hereinafter shown and described.

The object of the invention is to provide a simple and effective cutter for the purpose of dividing a potato into a number of segments, to be used for planting purposes, and, with this object in view, the cutter comprises a stand having a top provided with an opening upon which is located a plate. A series of blades is radially mounted upon the said plate above the central orifice provided therein. Standards are mounted upon the top of the table, and are connected together by cross-bars, which, in turn, are provided with perforations. A lever is fulcrumed to one of the standards and is pivotally connected by means of a link with a reciprocatory rod, which is mounted for such movement in the perforations provided in the connecting bars between the standards. A plunger or head is attached to the lower end of said rod and is located over the inner ends of the blades which are attached to the aforesaid plate.

In the accompanying drawings:—Figure 1 is a perspective view of the potato cutter. Fig. 2 is a transverse sectional view of a portion of the top of the table. Fig. 3 is a detail sectional view of one of the blades showing the securing device for the same.

The potato cutter proper is mounted upon a top 1, which is provided with an opening 2. The said top is supported upon trusses or legs 3. An annular plate 4 is secured at its edges to the top 1 about the edge of the opening 2 therein, and a series of vertically disposed blades 5 are mounted upon the upper side of the said plate 4. Bolts 6 pass transversely through the said plate and are provided with vertically disposed elongated slots 7 which receive the blades 5, and nuts 8 are screw-threaded upon the upper ends of the said bolts, and are adapted to bear against the upper surfaces of washers 9, the lower surfaces of which bear directly upon the upper edges of the blades 5. Thus means is provided for securing the said blades in position upon the upper surface of the plate 4. The blades 5 are radially disposed as indicated in Figs. 1 and 2 of the drawings. Said blades are provided with upper cutting edges 10, and toward their inner ends the said blades curve downwardly and terminate at points 11. Thus considering the assemblage of blades, a support is formed for the potato, which support consists of a pocket formed by the downwardly curved inner edge portions of the blades 5. Thus when a potato is placed upon the gang or assemblage of blades it is by gravity positioned practically with its center over the point where the inner ends of the said blades converge or meet.

Standards 12 and 13 are mounted upon the top 1 and are held or braced at their upper portions by means of the bars 14 which extend diametrically over the vertical plane of the opening 2 in the top 1. A lever 14' is fulcrumed to the standard 12. A rod 15 is slidably mounted in perforations 16 provided in the bars 14, and is provided at its lower end with a head or plunger 17. The upper end of the rod 15 is pivotally connected with the lever 14' by means of a link 18. The head or plunger 17 is preferably of wood, but it may be made of any other desired material.

From the above description, it is obvious that when a potato is placed upon the inner ends of the gang of blades and is positioned thereon as above indicated, and the operator depresses the free end of the lever 14', the rod 15 will be moved longitudinally through the instrumentality of the connecting link 18, and the plunger 17 will engage the potato and force the same down, so that the said blades will slice the potato into sections or segments which will pass through the spaces between the blades and drop through the perforation 2 in the table-top 1. Thus the potato is divided into segments of practically uniform size, admirably adapted for planting or seeding purposes.

Having described my invention, what I claim as new and desire to secure, by Letters Patent, is:—

A cutter comprising a support having an opening, an annular plate adapted to rest upon the support about the opening, bolts passing through the plate and having elongated closed end slots, blades passing through the slots in the bolts and being vertically disposed upon the upper surface of the plate, nuts screw threaded upon the bolts and clamping the blades against the plate, standards mounted upon the support and diametrically opposite each other with relation to the opening therein, bars connecting the standards together, a rod passing through the bars, a plunger attached to the lower end of the rod a lever fulcrumed to one of the standards and a link pivotally connecting the link with the upper end of the rod.

In testimony that I claim the foregoing as my own, I have hereto affixed my signature in the presence of two witnesses.

JAMES A. WISE.

Witnesses:
J. W. CASON,
W. T. VAUGHN.